United States Patent [19]
Rudak et al.

[11] Patent Number: 5,182,778
[45] Date of Patent: Jan. 26, 1993

[54] DOT-MATRIX VIDEO ENHANCEMENT FOR OPTICAL CHARACTER RECOGNITION

[75] Inventors: Peter Rudak, Hilton; George A. Hadgis, Rochester, both of N.Y.

[73] Assignee: Eastman Kodak Company, Rochester, N.Y.

[21] Appl. No.: 575,715

[22] Filed: Aug. 31, 1990

[51] Int. Cl.⁵ .............................................. G06K 9/40
[52] U.S. Cl. .......................................... 382/54; 382/50
[58] Field of Search ............................ 382/54, 51, 50

[56] References Cited

U.S. PATENT DOCUMENTS

| | | | |
|---|---|---|---|
| 3,609,685 | 7/1971 | Deutach | 340/146.3 AE |
| 4,476,495 | 10/1984 | Fujisawa et al. | 358/262 |
| 4,680,720 | 7/1987 | Yoshii et al. | 364/521 |
| 4,710,764 | 12/1987 | Van Cang | 340/728 |
| 4,809,342 | 2/1989 | Kappner | 382/11 |
| 4,903,123 | 2/1990 | Kawamura et al. | 358/75 |
| 4,947,446 | 8/1990 | Jutand et al. | 382/54 |
| 5,034,992 | 7/1991 | Kumagai | 382/54 |
| 5,038,388 | 8/1991 | Song | 382/54 |
| 5,054,100 | 10/1991 | Tai | 382/54 |
| 5,060,285 | 10/1991 | Dixit et al. | 382/54 |

FOREIGN PATENT DOCUMENTS

| | | |
|---|---|---|
| 0053935 | 6/1982 | European Pat. Off. . |
| 54153535 | 3/1979 | Japan . |
| 2208790 | 8/1990 | Japan . |

OTHER PUBLICATIONS

IBM Technical Disclosure Bulletin, vol. 32, No. 10B, Mar. 1990, NY., pp. 366–371, "N-Bit General Neighborhood Function Processing Element Operable at Image Rate".

Primary Examiner—David K. Moore
Attorney, Agent, or Firm—Dennis R. Arndt

[57] ABSTRACT

A method and apparatus for eliminating discontinuities inherent to binary digital image data when hard copy text is generated by a dot-matrix printer. An M×M matrix is moved over a bit-mapped image of said text one pixel at a time, and for each pixel position, pixels are selectively converted from white to black based on a predetermined set of rules.

5 Claims, 8 Drawing Sheets

| $n_{-3,3}$ | $n_{-2,3}$ | $n_{-1,3}$ | $n_{0,3}$ | $n_{1,3}$ | $n_{2,3}$ | $n_{3,3}$ |
|---|---|---|---|---|---|---|
| $n_{-3,2}$ | $n_{-2,2}$ | $n_{-1,2}$ | $n_{0,2}$ | $n_{1,2}$ | $n_{2,2}$ | $n_{3,2}$ |
| $n_{-3,1}$ | $n_{-2,1}$ | $n_{-1,1}$ | $n_{0,1}$ | $n_{1,1}$ | $n_{2,1}$ | $n_{3,1}$ |
| $n_{-3,0}$ | $n_{-2,0}$ | $n_{-1,0}$ | $n_{0,0}$ | $n_{1,0}$ | $n_{2,0}$ | $n_{3,0}$ |
| $n_{-3,-1}$ | $n_{-2,-1}$ | $n_{-1,-1}$ | $n_{0,-1}$ | $n_{1,-1}$ | $n_{2,-1}$ | $n_{3,-1}$ |
| $n_{-3,-2}$ | $n_{-2,-2}$ | $n_{-1,-2}$ | $n_{0,-2}$ | $n_{1,-2}$ | $n_{2,-2}$ | $n_{3,-2}$ |
| $n_{-3,-3}$ | $n_{-2,-3}$ | $n_{-1,-3}$ | $n_{0,-3}$ | $n_{1,-3}$ | $n_{2,-3}$ | $n_{3,-3}$ |

DOT-MATRIX VIDEO ENHANCEMENT FOR OPTICAL CHARACTER RECOGNITION

TECHNICAL FIELD OF THE INVENTION

The present invention relates to pre-processing for improving Optical Character Recognition (OCR) read rates of text generated with a dot-matrix print head, as well as improving read rates of poor quality text that may result from worn ribbons when used in conjunction with daisy wheel or near-letter quality printers. Specifically, the binary video image data of a dot-matrix character is modified prior to processing by an OCR device. Implementation of the present invention is capable of processing the image data at the full data rate (real-time processing) of the scanning device's output. The invention could also be applied to a stored image.

BACKGROUND OF THE INVENTION

Optical Character Recognition (OCR) devices require that a document be scanned and digitized. Once the image has been digitized and processed to correct for any discrepancies, the image data is stored in a memory device. The OCR device then examines the image data to determine the identity of each character stored in the memory. In doing so, the text image data is converted to a string of numerical codes (such as ASCII), thus retaining the identity of each individual character for future reference. The numerical codes can then be entered into a database or filed for data manipulation.

In applications where many forms are to be processed, OCR offers increased read rates and higher throughput than manual data entry. Unfortunately, OCR devices are only capable of processing a predetermined set of text characters. Because the forms processing industry accepts forms from many different sources, OCR devices must be capable of handling a variety of documents printed by many different printer devices. Currently, the OCR sites are forced to sort their documents, separating them into two classes of documents: OCR-readable and non-OCR readable text documents. In the latter case, manual data entry is required since OCR read accuracy of this class form is very poor.

The non-OCR-readable text class of documents includes handwritten text and text printed with a dot-matrix printer, as well as poor quality text (broken characters) resulting from the use of worn ribbons used in conjunction with daisy wheel or near-letter quality printers. The present invention relates to dot-matrix printed text by correcting the image data so as to eliminate discontinuities inherent to the way in which dot-matrix characters are printed, in effect creating continuous lines and curves from dot patterns generated by a dot-matrix print head. After having been so processed, the OCR device is able to analyze the image data and determine the numerical codes for the bit-mapped images more accurately.

In the past, there have been numerous inventions that examine the binary image data and correct for discontinuities in the characters. One such invention is disclosed in U.S. Pat. No. 3,609,685 by Edward Samuel Deutch, and describes a method for correcting the image prior to recognition. The method is ideal for correcting image data that has discontinuities that are not inherent to the shape of the character. This invention examined the shape of the character that had been scanned, digitized, and stored in a memory device. The image was examined by tracing the character's shape to determine the individual branch components that make up the character. In order to accurately identify the simplest branch component of the character, the invention required that there not be any discontinuities in the branch component, as any discontinuities would cause additional branch components to be created. Occasionally, undesired discontinuities may exist. To correct for these discontinuities, adjacent branch components are compared to determine if any can be connected together. However, in the case of dot-matrix generated text, such discontinuities are inherently present because of the spacing of the printing elements. These inherent discontinuities create many different branch components, thereby making it difficult for such an apparatus to determine which branch components need to be connected.

U.S. Pat. No. 4,791,679, by Lori L. Barski and Roger S. Gaborski, disclosed a method for improving broken or weak character image data. This invention was primarily concerned with evaluating neighboring regions to determine the percentage of black pixels within a region. The areas between the neighboring regions are, given a particular threshold, filled in so that the lines and curves of the character are smooth. It does not consider the spacing between the dots but rather the percentage of black pixels within specific regions. Also, none of the previous algorithms was implemented with real-time processing capability. They relied on a stored image in memory which could be manipulated via a software program.

DISCLOSURE OF THE INVENTION

It is the principle objective of the present invention to overcome many of the shortcomings encountered in the past and to modify the video image data of dot-matrix printed text in such a way that OCR read accuracy is improved. Accordingly, an M×M array of binary pixels is examined, and based on the number of white pixels between two black pixels, it is determined whether or not the white pixels should be converted to black pixels.

It is another objective of the present invention to perform the above mentioned task without the need for storing the complete image in a memory device, but rather only store as much of the image as needed to perform the task on each sub-section of the image.

It is still another objective of the present invention to process the image data as described above without any reduction in throughput of the image data as it is passed from the scanning device, or any other in-line process, to the OCR device's memory.

MODES OF CARRYING OUT THE INVENTION

Figure 1:
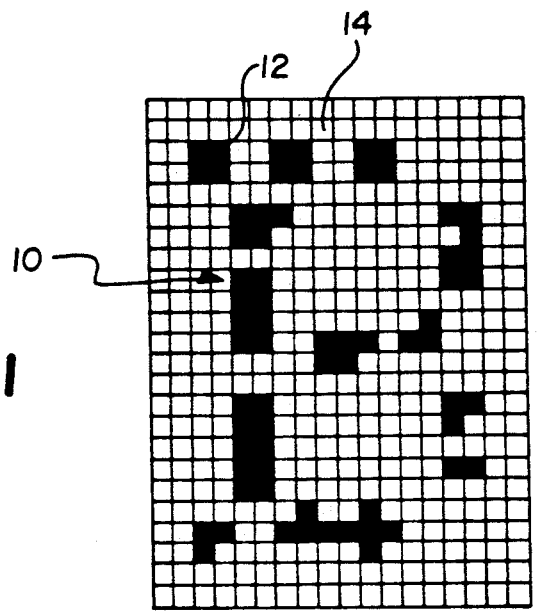
FIG. 1 illustrates an actual bit-mapped video representation of a dot-matrix printed letter "B"

Referring to FIG. 1, it can be seen that the digitized image data of the "B" that was printed by a dot-matrix printer is comprised of individual dots 12 and spaces 14 which correspond to the location of the pins of the print head, as it moves across the document to create the character. Each dot 12 and space 14 is made up of a collection of pixels 10. By examining the spaces 14 between dots 12 and applying a set of rules to the image data, the spaces 14 may be filled in.

Figure 2A:
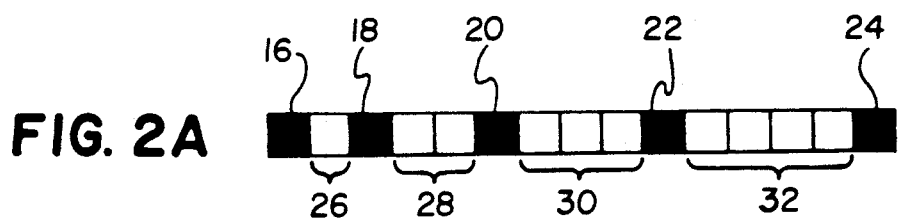
FIGS. 2A-2B illustrate the basic rules in one-dimension assuming that the minimum allowed white pixel run length is four.
Figure 2B:
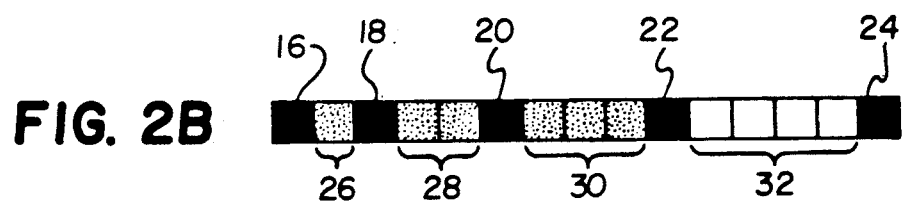

In order to understand the fundamentals of the present invention, it is better to first understand the one-dimensional case. FIG. 2A represents a one-dimensional bit pattern wherein the rules to be applied specify that white pixel runs of less than four pixels shall not exist and all white pixels runs of four or more pixels shall remain unchanged. The present invention examines the end reference pixels 16-24 and the pixel spaces 26-32 between them with the end reference pixels 16-24 being defined as any black pixels within a neighborhood of white pixels that are used in determining the white pixel run length. For example, end reference pixels 16 and 18 are considered end reference pixels separated by a white pixel 26. Similarly, end reference pixels 18 and 20 are considered end reference pixels separated by a white pixel run of two white pixels 28. In this example, all cases where there are less than four adjacent white pixels separating the end reference pixels, the rule requires that the adjacent pixels, be converted to black pixels as illustrated in FIG. 2B, where white pixel 26 and white pixel runs 28 and 30 would be converted to black pixels. However, pixel run 32 would remain white.

Figure 3A:
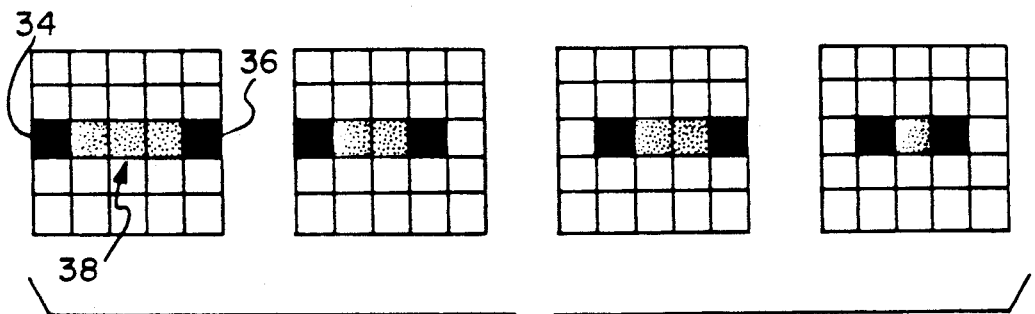
FIGS. 3A-3D illustrate the application of the basic rules applied in FIGS. 2A-2B but in two dimensions.
Figure 3B:
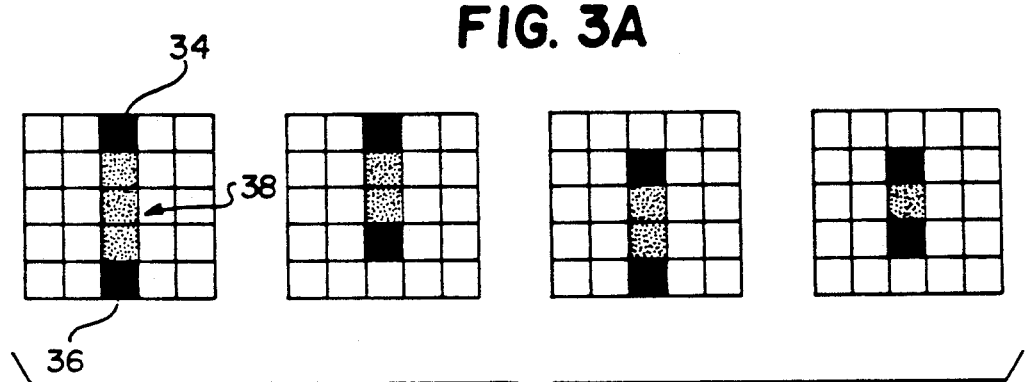
Figure 3C:
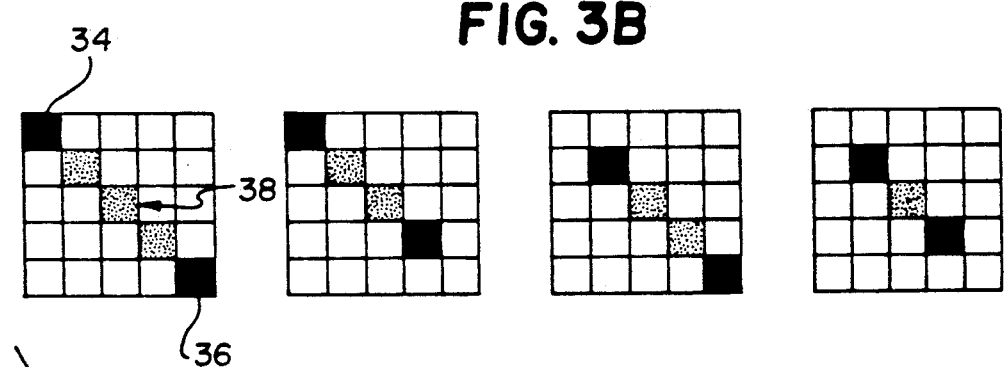
Figure 3D:
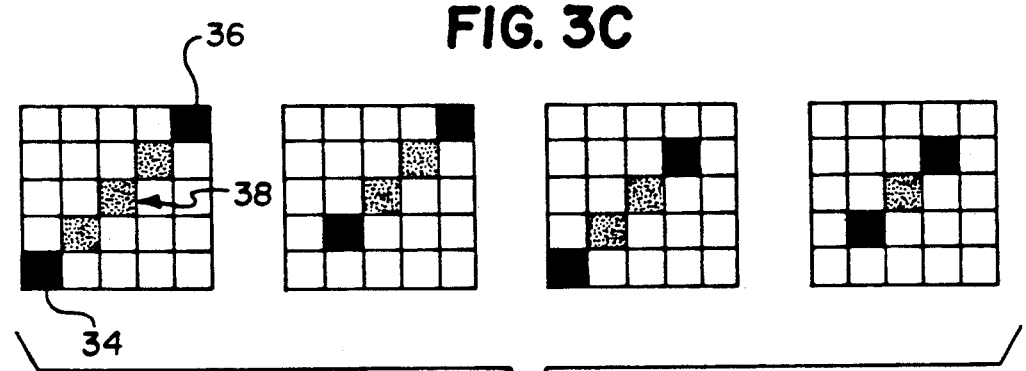

The processing for a two-dimensional image in the horizontal direction is illustrated in FIG. 3A. FIGS. 3B-3D illustrate the application of the above rules in the vertical (FIG. 3B) and diagonal directions as shown in FIGS. 3C and 3D. Because the space to be considered between pixels is limited to only a few pixels, the rules need only be applied to a small portion of the image at a time. In the above example, it is specified that white pixel runs of less than four shall not be allowed to exist. This suggests that a 5×5 matrix of image data could be constructed as illustrated in FIGS. 3A-3D. Each dimension will require 5 pixels, two for the end reference pixels 34 and 36 and three for the maximum pixel run in between 38. Or, in more general terms, an M×M matrix would be used where M = the maximum pixel run length which is the maximum pixel spacing between two dots (that could be changed) plus two end reference pixels 34 and 36.

Figure 4:
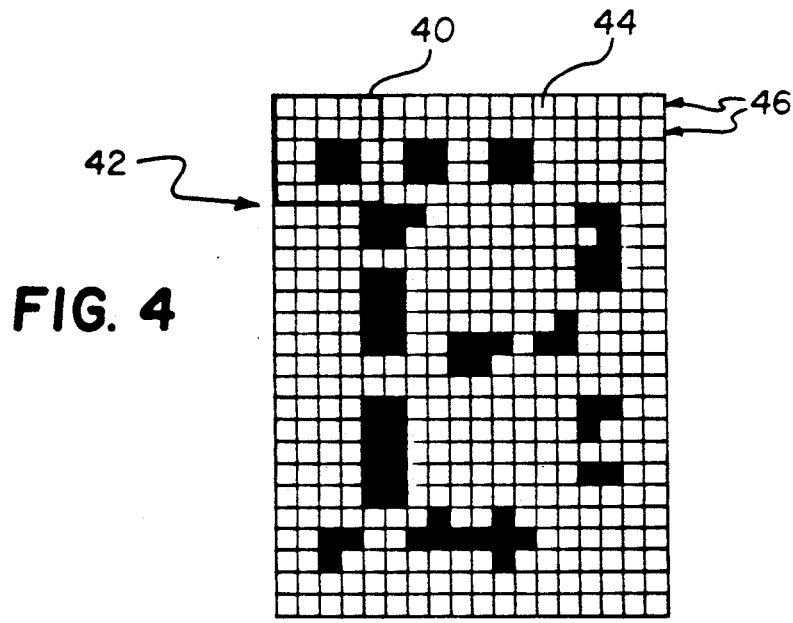
FIG. 4 illustrates the M×M matrix as it would appear in the initial position on the image.

FIG. 4 illustrates how these rules may be applied to a binary image. A pixel grid matrix 40 of size M×M where M=5 in the present example, is laid over the image 42. The rules are then applied to the M×M pixel grid matrix 40. Once the pixels in the pixel grid 40 have been processed and the necessary pixels changed, the pixel grid 40 can be thought of as being shifted to the right by one pixel 44 (FIG. 4) and the process repeated again. This process continues until the end of the scan line 46 is reached. Next, the pixel grid 40 is repositioned to the leftmost pixel of the next scan line. Again, the process of applying the rules and shifting the pixel grid 40 is done until the entire image has been processed. The resulting modified video data can now be used by the OCR apparatus.

Figure 5:
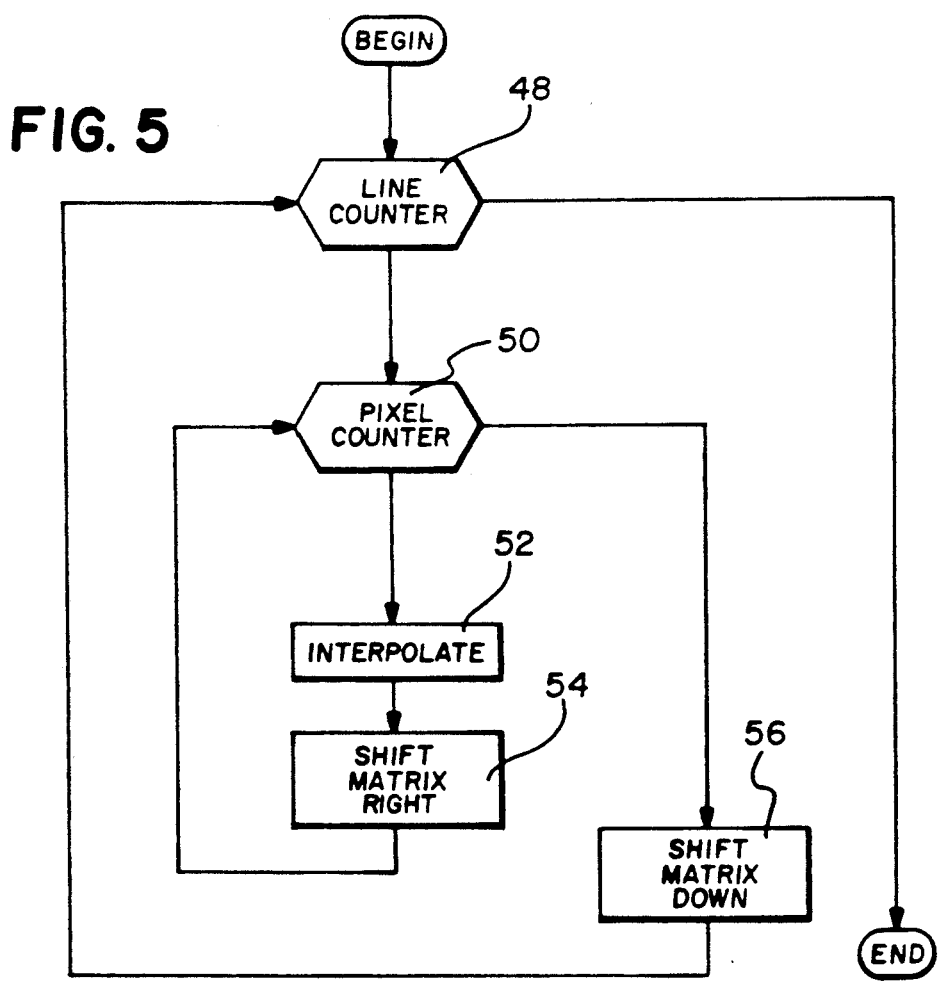
FIG. 5 is a flowchart for the current invention.

FIG. 5 illustrates the flowchart for the procedures described above. In step 48, a line counter is used to monitor the current scan line (vertical) position of the pixel grid over the image 42. Each time a complete scan line 46 has been processed, this line counter is incremented by one. Similarly, in step 50, a pixel counter is used to monitor the current position (horizontal) of the pixel grid over the image. As the pixel grid is shifted from left to right across the image, the pixel counter is incremented by one for each shift. Step 52 entitled "interpolate" carries out the process described above by applying the set of rules described earlier. Step 54 causes the pixel grid to be shifted across the bit mapped image after each pixel grid has been processed. As a scan line is completed, step 56 repositions the pixel grid to the left-most position of the next scan line.

Figure 6A:
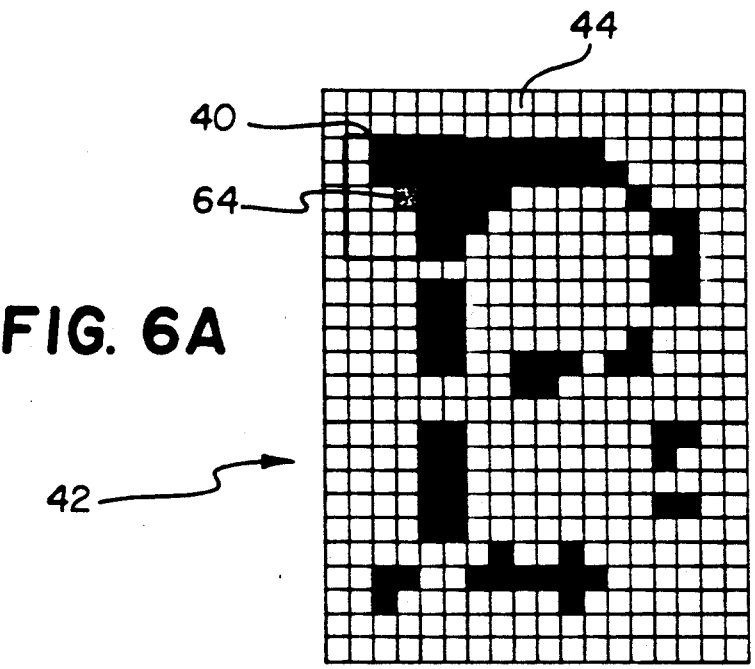
FIG. 6A is a partially processed image illustrating the effect of not implementing the qualification pixels.
Figure 6B:
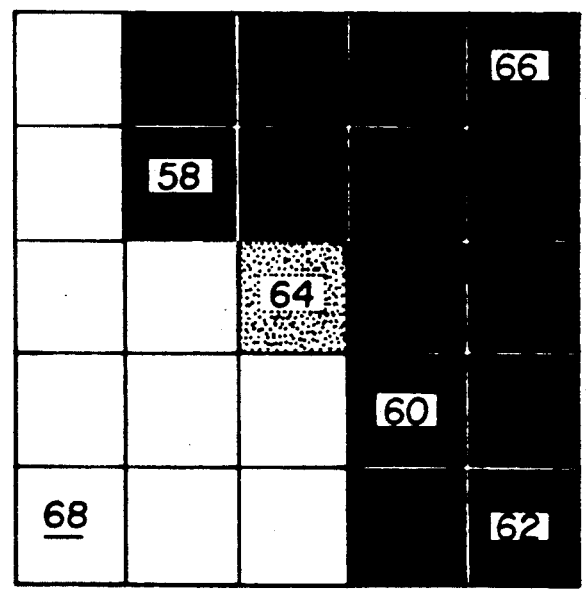
FIG. 6B is an enlarged view of the 5×5 matrix of pixels in the image of FIG. 6A.
Figure 7A:
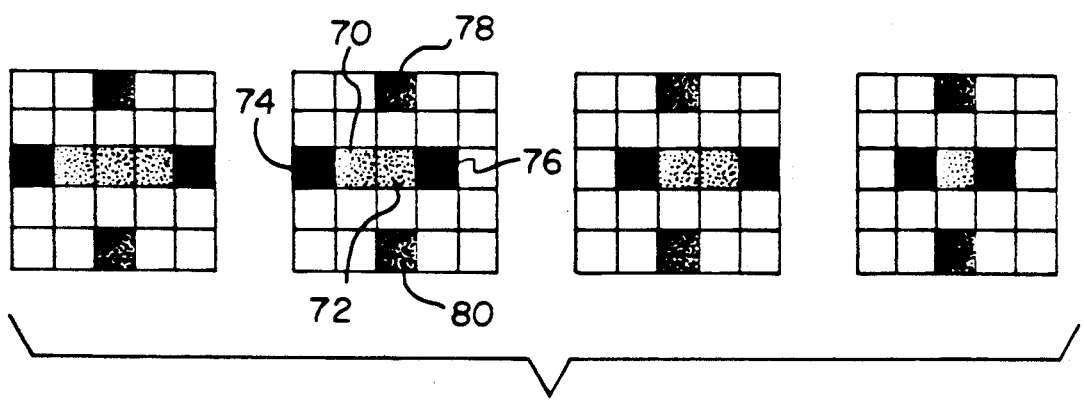
FIGS. 7A-7D illustrate the set of rules for a 5×5 matrix with qualification pixels added.
Figure 7B:
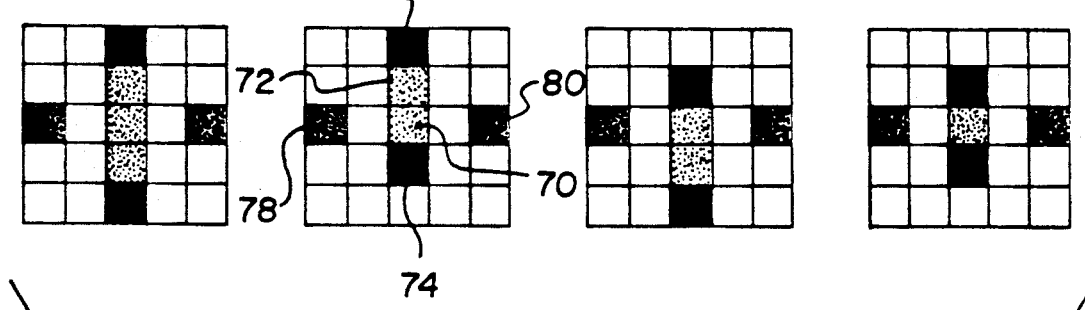
Figure 7C:
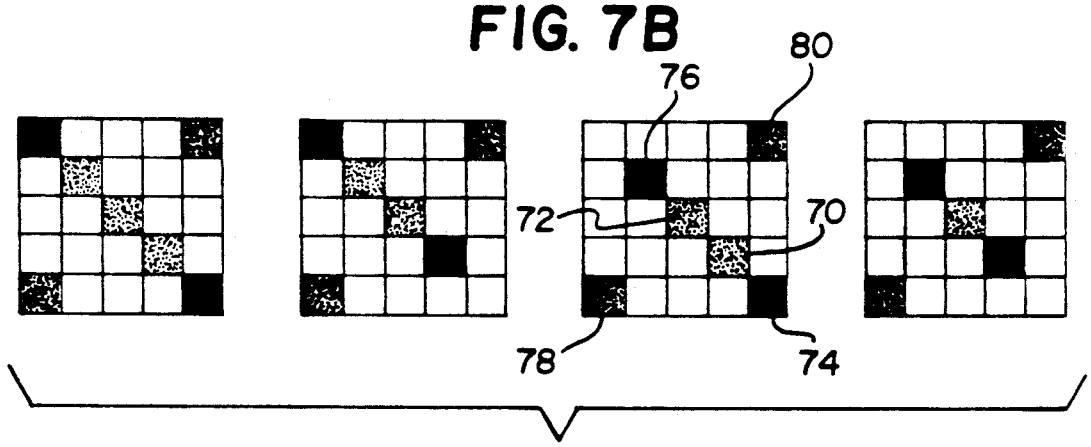
Figure 7D:
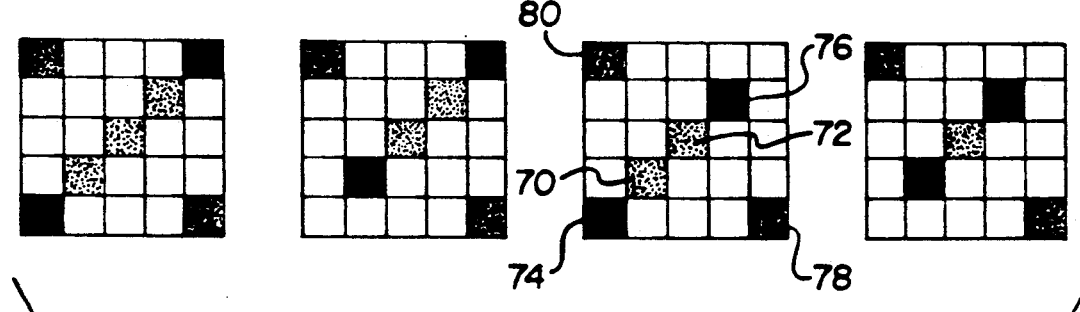

FIG. 6A illustrates how the image shown in FIG. 1 would appear after processing the first few pixels. A problem is encountered in this example concerning the left diagonal in the current pixel grid location. FIG. 6B is an enlarged view of the pixel grid shown in FIG. 6A at the current location in the image of FIG. 6A. Because pixels 58 through 62 are black, pixel 64 would, based on the current rules, be converted to black. As a result, unwanted areas, specifically corners of perpendicular intersections of lines, would be filled-in, distorting the image.

To avoid this type of problem, qualification pixels 66 and 68 are added to the pixel grid as shown in FIG. 6B. The qualification pixels 66 and 68 are used to detect perpendicular intersections of lines and limit the amount of rounding that may occur during this process. Using the basic rules, pixel 64 would be filled because pixels 58 through 62 are black. The qualification pixels 66 and 68 add additional requirements. Because qualification pixel 66 is black, pixel 64 would not be filled in with black. By adding the qualification pixel requirements, the basic rules are modified. The modified rules require that in order to fill in any run lengths, the end reference pixels must be black and both qualification pixels must be white.

Because perpendicular intersections of lines are common in all four directions, as previously discussed, the use of the qualification pixel described above must be applied in the horizontal, vertical, and both diagonal directions as illustrated in FIGS. 7A-7D. Pixels 70 and 72 comprise the white pixel run length that may be changed based on the state of the end reference pixels 74 and 76 and qualification pixels 78 and 80 as previously defined. FIGS. 7A-7D show all the variations that may occur using qualification pixels in the vertical and horizontal directions as well as in both diagonal directions. In all cases in FIGS. 7A-7D, the end reference pixels are solid black (74 and 76), the white pixels (70,72) are lightly stippled with the qualification pixels (78, 80) shown heavily stippled. The last drawing in each of the FIGS. 7A-7D shows a single white pixel in the center rather than two or three, as shown earlier.

Figures 8, 9:
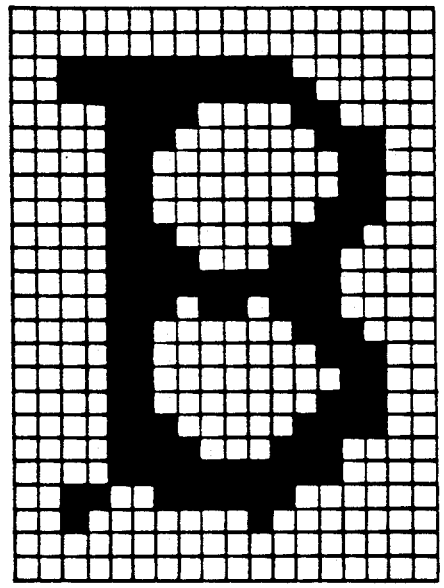
FIG. 8 is an illustration of the image after processing, using the present invention with qualification pixels.
FIG. 9 is an illustration of the matrix mapping indices.

FIG. 8 illustrates how the original letter "B" shown in FIG. 1 would appear after it had been fully processed using the rules described.

Processing Algorithm

The M×M pixel grid discussed above can be represented in matrix form as indicated in FIG. 9. The center pixel is the current pixel of interest and all indices into the matrix are referenced relative to this center pixel of interest.

In the equations below, variable "C" defines the fill (black) value and is based on whether the image is positive (0=white, 1=black) or negative (0=black, 1=white). In the present example, C=1. The variable "M" defines the matrix size with values greater than or equal to 3.

Using the matrix shown in FIG. 9, the following equations are applied which generalize the previously defined basic set of rules as the pixel grid is shifted across and down the image. The variable "a" is a range variable defining the valid range of offsets for the pixels within the matrix that can be changed relative to the center pixel, where:

$$-\text{integer}[(M-1)/2] < a < \text{integer}[M/2]$$

The indices for the end reference pixels in the matrix are defined using the subscripts i (positive end reference pixel) and j (negative end reference pixel) where:

$$0 < i < \text{integer}[M/2] - \text{integer}[(M-1)/2] \leq j < 0$$

Equation 1 (below) defines the center pixel of the matrix. The center pixel takes on the fill value if any combination of end reference pixels are of the same fill value in any direction. The first term of equation 1 tests the vertical end reference pixels, the second term checks the horizontal end reference pixels, the third term tests the right diagonal end reference pixels, and the fourth term checks the left diagonal and end reference pixels.

$$n_{0,0} = C \text{ for any } [(n_{0,i} = C \text{ and } n_{0,j} = C) \text{ or } \quad \text{Equation (1)}$$
$$(n_{i,0} = C \text{ and } n_{j,0} = C) \text{ or } (n_{i,i} = C \text{ and } n_{j,j} = C) \text{ or }$$
$$(n_{i,-i} = C \text{ and } n_{j,-j} = C)]$$

Otherwise, $n_{O,O}$ remains unchanged.

For M>3, equations (2) through (5) also apply. In these cases, more than the center pixel is considered for changing pixel values. The index for each additional pixel is referenced by the subscript "a" and is bound by both end reference pixels. Equation 2 defines the vertical pixels of the matrix and is a subset of equation 1.

$$n_{O,a} = C \text{ for any } (n_{O,i} = C \text{ and } n_{O,j} = C) \quad \text{Equation (2)}$$

Otherwise, $n_{O,a}$ remains unchanged.
This equation defines the horizontal pixels of the matrix and is a subset of equation 1.

$$n_{a,O} = C \text{ for any } (n_{i,O} = C \text{ and } n_{j,O} = C) \quad \text{Equation (3)}$$

Otherwise, $n_{a,O}$ remains unchanged.
This equation defines the right diagonal pixels of the matrix and is a subset of equation 1.

$$n_{a,a} = C \text{ for any } (n_{i,i} = C \text{ and } n_{j,j} = C) \quad \text{Equation (4)}$$

Otherwise, $n_{a,a}$ remains unchanged.
This equation defines the left diagonal pixels of the matrix and is a subset of equation 1.

$$n_{a,-a} = C \text{ for any } (n_{i,-i} = C \text{ and } n_{j,-j} = C) \quad \text{Equation (5)}$$

Otherwise, $n_{a,-a}$ remains unchanged.

The above equations can be expanded to support the concept of qualification pixels as follows. The addition of the qualification pixels requires that the indices for the qualification pixels be defined as follows.

$$I = \text{integer}[M/2] \text{ and } J = -\text{integer}[(M-1)/2]$$

Equation 6 defines the center pixel of the matrix. The center pixel takes on the fill value if any combination of end reference pixels are of the same fill value in any direction provided that the qualification pixel in the perpendicular direction is of the same fill value. The first term of equation 6 tests the vertical end reference pixels and their perpendicular qualification pixels, the second term checks the horizontal end reference pixels and their perpendicular qualification pixels, the third term tests the right diagonal end reference pixels and their perpendicular qualification pixels, and the fourth term checks the left diagonal end reference pixels and their perpendicular qualification pixels.

$$n_{0,0} = C \text{ for any } [(n_{0,i} = C \text{ and } n_{0,j} = C \text{ and} \quad \text{Equation (6)}$$
$$n_{I,0} \neq C \text{ and } n_{J,0} \neq C) \text{ or } (n_{i,0} = C \text{ and } n_{j,0} = C \text{ and}$$
$$n_{0,I} \neq C \text{ and } n_{0,J} \neq C) \text{ or } (n_{i,i} = C \text{ and } n_{j,j} = C \text{ and}$$
$$n_{I,-I} \neq C \text{ and } n_{J,-J} \neq C) \text{ or } (n_{i,-i} = C \text{ and}$$
$$n_{j,-j} = C \text{ and } n_{I,I} \neq C \text{ and } n_{J,J} \neq C)]$$

Otherwise, $n_{O,O}$ remains unchanged.

For M>3, equations (7) through (10) also apply. In these cases, more than the center pixel is considered for changing pixel values. The index for each additional pixel is referenced by the subscript "a" and is bound by both end reference pixels. Equation 7 defines the vertical pixels of the matrix and is a subset of equation 6.

$$n_{0,a} = C \text{ for any } (n_{0,i} = C \text{ and } n_{0,j} = C \text{ and} \quad \text{Equation (6)}$$
$$n_{I,0} \neq C \text{ and } n_{J,0} \neq C)$$

Otherwise, $n_{O,a}$ remains unchanged.
This equation defines the horizontal pixels of the matrix and is a subset of equation 6.

$$n_{a,0} = C \text{ for any } (n_{i,0} = C \text{ and } n_{j,0} = C \text{ and} \quad \text{Equation (8)}$$
$$n_{0,I} \neq C \text{ and } n_{0,J} \neq C)$$

Otherwise, $n_{a,O}$ remains unchanged.
This equation defines the right diagonal pixels of the matrix and is a subset of equation 6.

$$n_{a,a} = C \text{ for any } (n_{i,i} = C \text{ and } n_{j,j} = C \text{ and} \quad \text{Equation (9)}$$
$$n_{I,-I} \neq C \text{ and } n_{J,-J} \neq C)$$

Otherwise, $n_{a,a}$ remains unchanged.
This equation defines the left diagonal pixels of the matrix and is a subset of equation 6.

$$n_{a,-a} = C \text{ for any } (n_{i,-i} = C \text{ and } n_{j,-j} = C \text{ and} \quad \text{Equation (10)}$$
$$n_{I,I} \neq C \text{ and } n_{J,J} \neq C)$$

Otherwise, $n_{a,-a}$ remains unchanged.

The use of an M×N matrix in the algorithm is possible. The values of M and N are dependant upon the dot resolution of the dot matrix printer as well as the pixel resolution of the scanning device in both the x and y directions. If we assume that the resolutions are the same in both the x and y directions, then the application of an M×M matrix makes sense. It also has advantages when being implemented in hardware for real time operation. However, should the resolutions be different in the x and y directions, then it may be desirable to implement an M×N matrix.

Assuming N is the smaller dimension (y direction), then N should be chosen to ensure that dots in the diagonal directions can be connected. For example, if the dot spacing in the diagonal direction is 4 pixels, then N should be chosen to be 6. It should be noted that for the asymmetrical matrix in the present example, the rules are modified in such a way that the x direction accounts for pixel spacings of M−2 while the remaining directions account for N−2 pixel spacings.

The above discussion assumes that the diagonal directions are at 45 degree angles with the horizontal and/or vertical directions. The same idea could be expanded to include the case where angles other than 45 degrees are desired. Such is the case with different resolutions in the x and y directions. In this case, an interpolation could be done between the end reference pixels to determine which pixels in between should be filled in. For example, a square matrix (5×5) would have the following left diagonal with a 45 degree angle to the horizontal:

```
1 0 0 0 0
0 1 0 0 0
0 0 1 0 0
0 0 0 1 0
0 0 0 0 1
```

An asymmetrical matrix (such as 7×4) might have the following left diagonal with approximately a 30 degree angle to the horizontal:

```
1 1 0 0 0 0 0
0 0 1 1 0 0 0
0 0 0 1 1 0 0
0 0 0 0 0 1 1
```
arctan 4/7 ≈ 30 degrees The algorithm could also be used with only a subset of the four directions discussed above. For example, only the horizontal and vertical directions could be considered, or in an extreme case, perhaps only the horizontal or only the vertical direction is to be considered. In this case, an M×1 or 1×M matrix would be constructed.

DESCRIPTION OF BLOCK DIAGRAM

Figure 10A:
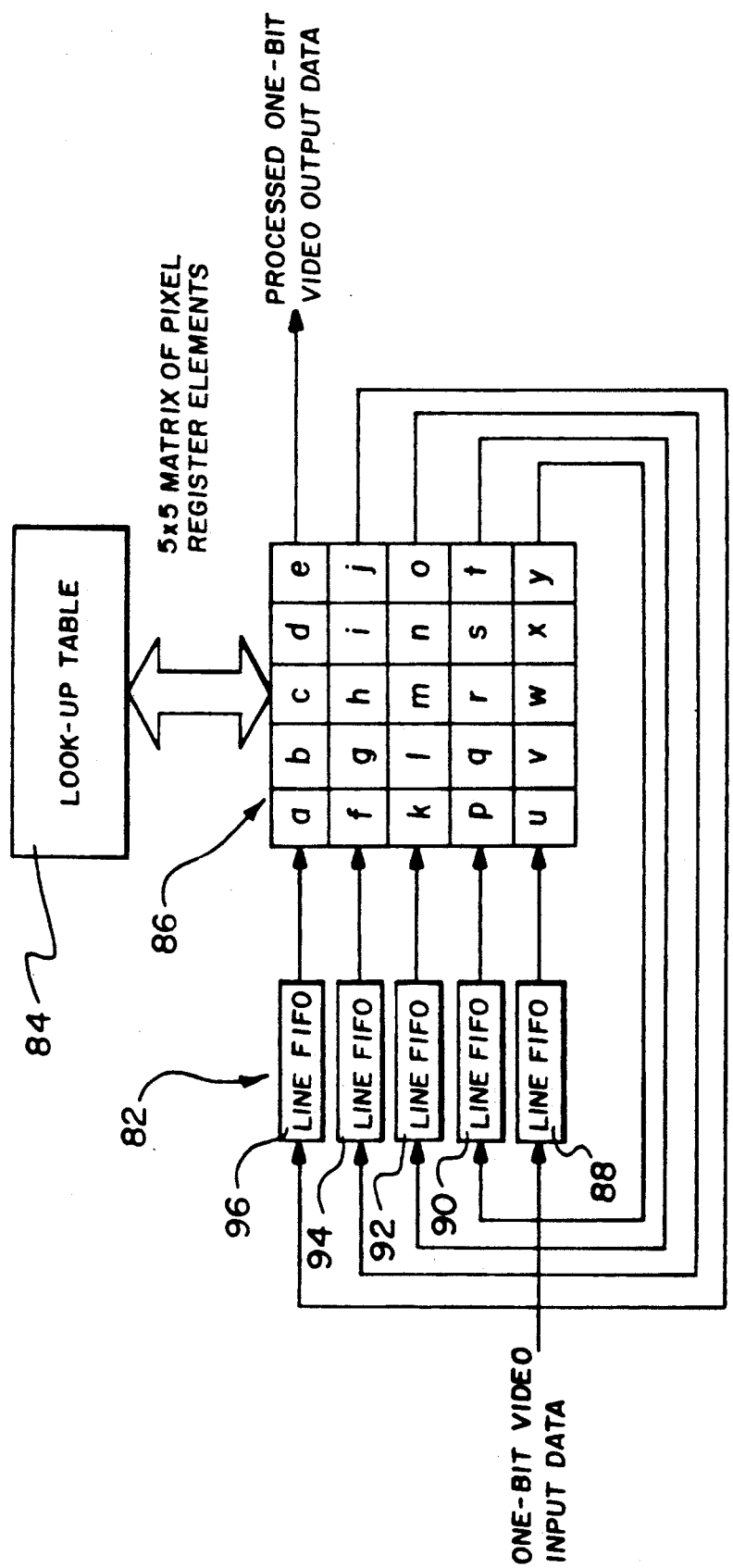
FIGS. 10A-10C are block diagrams of the circuits for implementing the present invention in a real time basis.

FIG. 10A illustrates the block diagram for implementing the present invention and is comprised of a multiple line store register 82 for the temporary storage of scan line data, a look-up table 84 used to apply the equations to the matrix, and a 5×5 pixel register matrix 86. In addition, an interface is used to allow the above circuits to be coupled to a microprocessor (not shown) for downloading look-up table data and passing control/status bytes from the microprocessor.

Although the algorithm has been described such that a pixel grid is being shifted across a stationary image, the implementation of this algorithm also may be described in such a way that the bit mapped image data is viewed as being shifted across a stationary pixel grid using a 5×5 pixel grid matrix as described below. This method is better suited for a hardware implementation.

Binary image data is synchronously transmitted serially starting in the upper left-hand corner of the image. The data is transmitted to the circuit one pixel at a time from left to right, across a scan line 46 (FIG. 4). Once a complete scan line has been transmitted, the next scan line is sent in a similar fashion. Thus, the output of the scanning device is serially transmitted on a pixel by pixel basis from left to right, and top to bottom of the image.

Figure 10B:
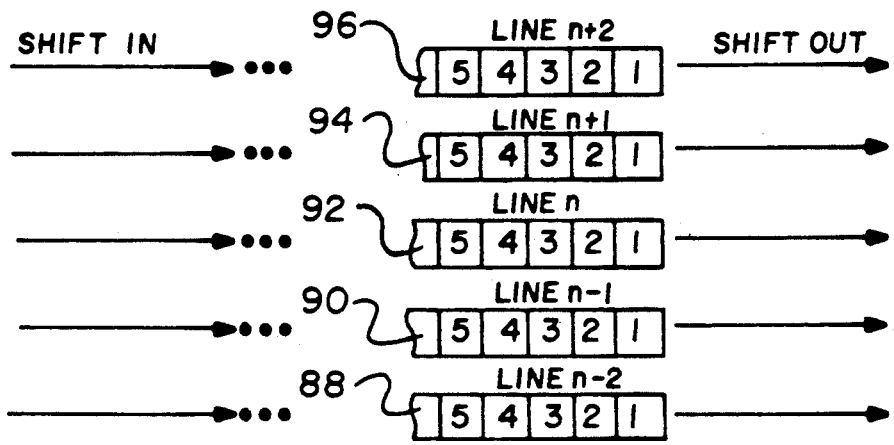

Multiple line store register 82 is a memory device capable of storing M (vertical dimension of pixel register matrix) complete scan lines. Each of the FIFO's in multiple line store register 82 is capable of shifting binary data serially in such a way that the first pixel shifted in is the first pixel shifted out. A First-In First-Out (FIFO) line buffer is such an apparatus. Because the preferred embodiment of the present invention uses a 5×5 pixel grid matrix, the multiple line store register 82 would require 5 FIFO line buffers 88-96. The purpose of the multiple line store register 82 is to maintain vertical alignment of the scan lines being processed. Accordingly, the use of multiple line store register 82 insures that the first pixel of a given scan line will be above or below the first pixel of the previous or next scan line, respectively. FIG. 10B illustrates the vertical alignment required using FIFO line buffers 88-96 in multiple line store register 82. Pixel 1 of line n+2 is vertically aligned over pixel 1 of line n+1 which in turn is aligned with pixel 1 of line n.

FIG. 10A shows the output of FIFO line buffer 88 feeding cell "u" of pixel register matrix 86 and eventually feeding FIFO line buffer 90 in FIG. 10B. Likewise, FIFO line buffer 90 feeds cell "p" of pixel register matrix 86, which in turn feeds FIFO line buffer 92 and so on. In the case of the last line, FIFO line buffer 96, the output feeds cell "a" of pixel register matrix 86. The output of cell "e" of the pixel register matrix 86 is used as the output of the circuit rather than an input to another line store register.

Figure 10C:
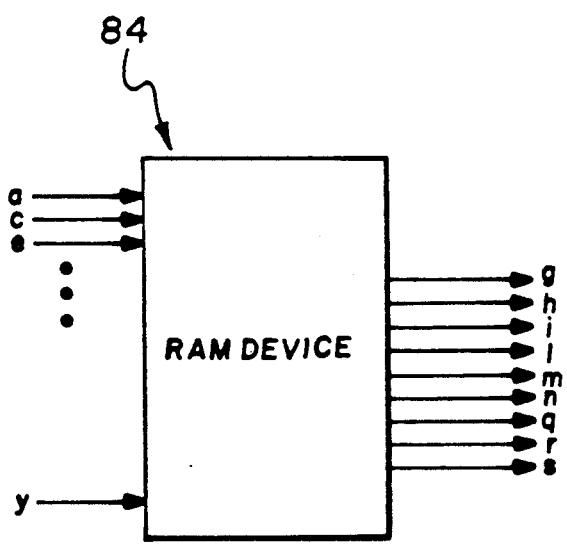

A block diagram of the look-up table 84 is shown in FIG. 10C. A Random Access Memory (RAM) device can be used for the look-up table 84. In this way, for every combination of matrix pixels that exist, a corresponding table output can be created which follows the preestablished set of rules. In the example described above, 25 address bits would exist for a total of $2^{25}=33,554,432$ addressable locations or in the general case, $2^{(M \times M)}$. At the time of this writing, the amount of memory required is impractical for M larger than 4.

Some reduction in memory size is certainly required for practicality and thus may be done by recalling that for M larger than 4, not all the elements in the pixel register matrix 86 are used. This can be seen by referring to FIGS. 3 and 7, where some pixel register elements are not found to be used at all, and therefore, can simply pass the currently stored pixel register element data on to the next pixel register element. In the current embodiment of a 5×5 matrix, pixel register elements b, d, f, j, p, t, v, and x are not used by the algorithm and therefore, are not used as input. However, all other pixel register elements a, c, e, g, h, i, k, 1, m, n, o, q, r, s, u, w, and y are used (see FIG. 10A). As a result, the total number of addressable locations is reduced to $2^{17}=131,072$. Memory requirements are further reduced by the fact that the horizontal and vertical, and diagonal locations are independent of one another. As a result, 2 512 byte ($2^9$) devices could easily be used.

Referring back to the rules associated with FIGS. 3 and 7, only a subset of pixels can be changed. In the preferred embodiment (FIG. 10A), pixel register elements g, h, i, 1, m, n, q, r, and s are the only elements that can be changed. Accordingly, the input to these pixel register elements is the output of the look-up table 84. All other elements remain unchanged as the image data is shifted through the matrix. For example, pixel register matrix cell "a" would shift into pixel register matrix cell "b" unchanged. Whereas, pixel register matrix cell "g" would shift into pixel register matrix cell "h" via the look-up table 84. In this way, the input to pixel register matrix cell "h" would be a function of all the predefined inputs to the look-up table 84.

Image processing is accomplished when binary pixels are synchronously shifted into FIFO line buffer 88 and into the pixel register matrix 86 cell "u". Similarly, as the image data is processed through the pixel register matrix 86, it is synchronously shifted into FIFO line buffer 90. Likewise, FIFO line buffers 92-96 are synchronously loaded and unloaded, supplying image data to the pixel register matrix 86 for processing. The output of pixel register matrix 86 cell "e" is used as the output of the circuit.

The present invention has been implemented in both software and hardware and found to improve OCR read rates of draft quality dot-matrix printed text dramatically. Dot-matrix text printed with a used ribbon resulted with OCR read rates of approximately 40%. Upon applying the basic set of preprocessing rules to the image, OCR read rates were increased to 92%. Text printed with a better ribbon was found to have OCR read rates of 92%. Once the image was preprocessed using the present invention, OCR read rates increased to 97% and with the use of qualification pixels it further increased to 98%. Because of the sequential nature of software, approximately 20 minutes was required to process an 8½ — ×11" document. However, the hardware implementation was implemented to operate at the full data rate of the scanning device, in this case, approximately 0.6 sec. was required for an 8½×11 inch document.

| | Experimental Results | | |
|---|---|---|---|
| Description | No Processing | Basic Processing | Basic Processing w/Qualification Pixels |
| Poor Quality Text | 40% | 92% | Not tested |
| Good Quality Text | 92% | 97% | 98% |

Advantages and Industrial Applicability

The present invention is used to improved OCR read rates of draft quality dot-matrix printed text. Specifically, the present invention eliminates discontinuities inherent in dot-matrix printed text because of the spatial print elements. It has been found experimentally that a matrix size of M=4 or greater works well when scanning typical 9-pin dot-matrix printed text at 200 dots per inch.

There are three applications where this invention can have applicability.

1) improving read rates of draft quality dot-matrix printed text.

2) improving read rates of poor quality text as a result of worn ribbons such that the image of the document contains broken characters from daisy wheel or near-letter quality printers or missing dots from draft quality or near-letter quality dot-matrix printers.

3) improving read rates by repairing broken characters in images of laser printed text. In this case, fine lines of characters may have been scanned in such a way that the fine lines are eliminated in the output, resulting in broken characters.

Although the invention has been presented as being applied to paper documents that are scanned, it could also find application in reading microfilm containing images of documents printed by a dot-matrix printer.

In addition, the invention could find applicability in the graphics area to eliminate discontinuities of scanned line drawings. As with text, scanned line drawings may sometime contain broken lines. It may be useful for drawings where there is good (greater than M+1) pixel separation of discrete lines.

What is claimed is:

1. A method for use in an apparatus for improving optical character recognition of printed draft quality dot-matrix characters of an image to be scanned, comprising the steps of:

scanning an image with an electronic scanning device and generating signals representing the scanned image as rows and columns of pixels;

sending the signals of the scanned image to a binary digital filter that performs the following steps;

locating kernel of a first integer, M, M pixel rows and a second integer, N, N pixel columns in particular position in said scanned image where M and N are integers greater than two;

modifying the scanned image by moving said kernel between adjacent pixel positions and applying the following set of rules:

a) if two black pixels are separated by no more than N−2 white pixels in the horizontal direction, convert signals representing the white pixels to black;

b) if two black pixels are separated by no more than M−2 white pixels in the vertical direction, convert signals representing the white pixels to black;

c) if two black pixels are separated by no more than M−2 white pixels in the first diagonal direction, convert signals representing the white pixels to black;

d) if two black pixels are separated by more than M−2 white pixels in the second diagonal direction convert signals representing the white pixels to black;

applying the above steps to all pixels in said image; outputting the modified image for optical character recognition.

2. The method as set forth in claim 1 wherein the white pixels are used as a reference and black pixels are converted to white if the predefined conditions have been met.

3. A method for use in an apparatus for improving character recognition of printed draft quality dot-matrix characters of an image to be scanned, comprising the steps of:

scanning an image with an electronic scanning device an generating signals representing a scanned image as rows and columns of pixels;

sending the signals of the scanned image to a binary digital filter that performs the following steps;

locating a kernel of M pixel rows and N pixel columns in a particular position in said image where M and N are integers greater than two;

moving said kernel to the next adjacent pixel position and applying the following set of rules;

a) if two black pixels are separated by no more than M−2 white pixels in the horizontal direction and the two end pixels in the vertical direction are not black, convert signals representing the white pixels to black;

b) if two black pixels re separated by no more than N−2 white pixels in the vertical direction and the two end pixels in the horizontal direction are not black, convert signals representing the white pixels to black;

c) if two black pixels are separated by no more than N−2 white pixels in either diagonal direction are not black, convert signals representing the white pixels to black;

applying the above steps to all pixels in the image;

outputting the modified image for optical character recognition.

4. A method for use in an apparatus for improving the optical character recognition of printed draft quality dot matrix characters of an image to be scanned, comprising the steps of:

scanning an image with an electronic scanning device and generating signals representing the scanned image as rows and columns of pixels;

sending the signals representing the scanned image to a binary digital filter that performs the following steps;

locating a kernel of M pixel rows and M pixel columns in a particular position in said image where M is an integer greater than two;

modifying the scanned image by moving said kernel to the next adjacent pixel position and applying the following set of rules:

a) if two black pixels are separated by no more than M−2 white pixels in either the horizontal or vertical direction, convert signals representing the intervening white pixels in that direction to black;

b) if two black pixels are separated by no more than M−2 white pixels in either diagonal direction, convert signals representing the intervening white pixels in that direction to black;

applying the above steps to all pixels in the image;

outputting the modified image for optical character recognition.

5. The method as set forth in claim 4 wherein said rules further include the use of qualification pixels which are end pixels located midway on the side of the kernel and perpendicular to either the horizontal or vertical direction being considered for pixel conversion, and also located in opposing corners of the kernel and perpendicular to the diagonal direction being considered for pixel conversion; said qualification pixels, for each direction must be white before pixel signal conversion can take place in the direction orthogonal to a line connecting said qualification pixels.

* * * * *

UNITED STATES PATENT AND TRADEMARK OFFICE
CERTIFICATE OF CORRECTION

PATENT NO. : 5,182,778

DATED : January 26, 1993

INVENTOR(S) : Peter Rudak, et. al.

It is certified that error appears in the above-indentified patent and that said Letters Patent is hereby corrected as shown below:

Column 10, Claim 1, line 49, delete "by more" and insert therefor --by no more--.

Column 10, Claim 3, line 65, delete "an" and insert therefore --and--.

Column 11, Claim 3, line 13, delete "re" and insert therefore --are--.

Signed and Sealed this

Eighth Day of February, 1994

Attest:

BRUCE LEHMAN

*Attesting Officer*  *Commissioner of Patents and Trademarks*